US009061743B2

(12) United States Patent
Ardavanis et al.

(10) Patent No.: US 9,061,743 B2
(45) Date of Patent: Jun. 23, 2015

(54) UNDERWATER PIPE-LAYING

(75) Inventors: Kimon Tullio Ardavanis, San Donato Milansese (IT); Teresio Signaroldi, Sordio (IT)

(73) Assignee: SAIPEM S.P.A., San Donato Milanese (Milan) (IT)

( * ) Notice: Subject to any disclaimer, the term of this patent is extended or adjusted under 35 U.S.C. 154(b) by 0 days.

(21) Appl. No.: 13/375,392

(22) PCT Filed: May 28, 2010

(86) PCT No.: PCT/EP2010/057405
§ 371 (c)(1),
(2), (4) Date: Feb. 8, 2012

(87) PCT Pub. No.: WO2010/139621
PCT Pub. Date: Dec. 9, 2010

(65) Prior Publication Data
US 2012/0134751 A1 May 31, 2012

(30) Foreign Application Priority Data

Jun. 1, 2009 (GB) .................................. 0909425.1
Jan. 13, 2010 (GB) .................................. 1000556.9

(51) Int. Cl.
*B63B 35/00* (2006.01)
*B63B 35/03* (2006.01)
(Continued)

(52) U.S. Cl.
CPC ................. *B63B 35/03* (2013.01); *F16L 1/202* (2013.01); *F16L 1/23* (2013.01)

(58) Field of Classification Search
CPC ............. F16L 1/23; F16L 1/202; B63B 35/03
USPC ........... 405/158, 166, 168.4; 254/245, 134.3; 414/745.4, 745.7, 746.3, 746.6
See application file for complete search history.

(56) References Cited

U.S. PATENT DOCUMENTS 1,295,320 A * 2/1919 Humphryes ................... 175/122
3,491,541 A * 1/1970 Berard ........................... 405/166
(Continued)

FOREIGN PATENT DOCUMENTS

FR 2600745 A1 * 12/1987 ................ F16L 1/18
GB 2364758 A 2/2002
(Continued)

OTHER PUBLICATIONS

International Search Report (PCT/ISA/210) issued on Sep. 5, 2011, by European Patent Office as the International Searching Authority for International Application No. PCT/EP2010/057405.
(Continued)

*Primary Examiner* — Thomas B Will
*Assistant Examiner* — Jessica H Lutz
(74) *Attorney, Agent, or Firm* — Buchanan Ingersoll & Rooney PC

(57) ABSTRACT

A pipe-laying vessel for S-laying a pipeline is provided, the vessel defining a pipe-laying path extending along the vessel. The vessel includes one or more track tensioners disposed along the pipe-laying path, and a travelling clamp assembly, including a clamp mounted for movement along a length of the pipe-laying path. The vessel may also include a fixed clamp assembly located on the pipe-laying path for clamping the pipeline in a fixed position on the pipe-laying path. At least one of the clamp assemblies may include a load bearing structure and a clamp wherein a downstream-facing portion of the clamp is in an abutting relationship with an upstream-facing portion of the load bearing structure such that a downstream force exerted, in use, by the pipeline on the clamp is transmitted to the load bearing structure.

22 Claims, 7 Drawing Sheets

(51) Int. Cl.
*F16L 1/20* (2006.01)
*F16L 1/23* (2006.01)

(56) References Cited

U.S. PATENT DOCUMENTS

| | | | | |
|---|---|---|---|---|
| 3,834,668 | A * | 9/1974 | Casey | 254/29 R |
| 4,615,509 | A * | 10/1986 | Biass | 254/264 |
| 5,048,793 | A * | 9/1991 | Mefford et al. | 254/29 R |
| 5,269,630 | A | 12/1993 | Bolin et al. | |
| 5,413,434 | A * | 5/1995 | Stenfert et al. | 405/166 |
| 5,823,712 | A * | 10/1998 | Kalkman et al. | 405/165 |
| 6,352,388 | B1 * | 3/2002 | Seguin | 405/166 |
| 6,524,030 | B1 | 2/2003 | Giovannini et al. | |
| 7,140,806 | B2 * | 11/2006 | Wentworth et al. | 405/184 |
| 7,641,421 | B2 * | 1/2010 | Roodenburg et al. | 405/166 |
| 7,955,028 | B2 * | 6/2011 | Roodenburg et al. | 405/166 |
| 8,210,775 | B2 * | 7/2012 | Clevelario et al. | 405/168.2 |
| 2002/0021942 | A1 | 2/2002 | Willis et al. | |
| 2003/0099515 | A1 | 5/2003 | Giovannini et al. | |
| 2003/0219313 | A1 | 11/2003 | Giovannini et al. | |
| 2006/0034666 | A1 | 2/2006 | Wentworth et al. | |
| 2007/0189857 | A1 | 8/2007 | Vergouw et al. | |
| 2008/0304912 | A1 | 12/2008 | Roodenburg et al. | |
| 2010/0021237 | A1 | 1/2010 | Willis et al. | |
| 2010/0080657 | A1 | 4/2010 | Bianchi | |
| 2010/0104370 | A1 | 4/2010 | van Egmond | |
| 2010/0232884 | A1 | 9/2010 | Roodenburg et al. | |
| 2011/0236137 | A1 | 9/2011 | Legaignoux et al. | |

FOREIGN PATENT DOCUMENTS

| | | |
|---|---|---|
| GB | 2387213 A | 10/2003 |
| WO | WO 00/05525 A2 | 2/2000 |
| WO | WO 00/05525 A3 | 2/2000 |
| WO | WO 01/48410 A1 | 7/2001 |
| WO | WO 02/057675 A1 | 7/2002 |
| WO | WO 2005/085692 A1 | 9/2005 |
| WO | WO 2006/085739 A1 | 8/2006 |
| WO | WO 2007/000609 A2 | 1/2007 |
| WO | WO 2007/000609 A3 | 1/2007 |
| WO | WO 2007/108673 A1 | 9/2007 |
| WO | WO 2008/041837 A1 | 4/2008 |
| WO | WO 2008/107186 A1 | 9/2008 |
| WO | WO 2008/148464 A1 | 12/2008 |
| WO | WO 2009/153352 A2 | 12/2009 |
| WO | WO 2009/153354 A2 | 12/2009 |

OTHER PUBLICATIONS

Written Opinion (PCT/ISA/237) issued on Sep. 5, 2011, by European Patent Office as the International Searching Authority for International Application No. PCT/EP2010/057405.

United Kingdom Search Report for GB 0909425.1 dated Sep. 24, 2009.

United Kingdom Search Reports for GB 0909425.1 dated Feb. 9, 2010.

* cited by examiner

UNDERWATER PIPE-LAYING

TECHNICAL FIELD

This invention relates to a vessel for laying a pipeline at sea and to a method of laying a pipeline. The invention is concerned particularly with clamps on the path along which the pipeline is guided by the vessel. The invention also relates to clamp assemblies for clamping a pipeline on a pipe-laying path of a pipe-laying vessel.

BACKGROUND OF THE INVENTION

When laying a pipeline at sea one of two methods is commonly used: either the "S" laying method or the "J" laying method. The two methods are named in accordance with the general shape adopted by the pipeline during laying.

In "S" laying, the pipeline leaves the vessel at little or no inclination to the horizontal, adopts a steeper inclination in the water and then returns to a generally horizontal disposition on the seabed. The tension in the pipeline is often accommodated by a series of track tensioners mounted along the pipe-laying path, on the vessel. The track tensioners support the weight of the pipeline and control passage of the pipeline.

In "J" laying, the pipeline leaves the vessel at a steep or vertical inclination and the inclination steadily reduces until the pipeline is in a generally horizontal disposition on the seabed. "J" laying often involves moving a new pipeline section from a substantially horizontal position (along the deck of the vessel) into a vertical position to align with a J lay tower mounted on the vessel. A lower end of the new pipeline section is welded to the upper end of the pipeline, which is held in place, suspended from the vessel, by a fixed clamp, located towards the bottom of the J lay tower. Once the new section of pipeline has been added to the existing pipeline, the fixed clamp is released and the pipeline lowered down the J lay tower. During such lowering the tension in the pipeline may be accommodated by a travelling block or track tensioners. The upper end of the newly lengthened pipeline (i.e. the upper end of the new section of pipeline) is then clamped by the fixed clamp, the travelling block, if used, is returned to its original position towards the top of the J lay tower and the process repeated.

As interest in laying pipeline in deep water has increased, so "J" laying has become more attractive because the pipeline naturally adopts a vertical or near-vertical orientation far from the seabed. "J" laying is not, however, preferred in shallower water where the natural path of the pipeline is only ever inclined at a shallow angle as it passes to the seabed and "S" laying is therefore advantageous.

"S" laying can be employed in deep water provided the pipeline being laid can be supported from the vessel until it has reached a relatively steep inclination to the horizontal. That, however, requires a considerable length of support, because the radius of bending to which the pipeline can be subjected is limited, especially in the case of large diameter pipelines.

WO 2007/000609 A2 discloses a pipe-laying vessel with S-lay apparatus. The S-lay apparatus includes a stinger for supporting the pipeline in an arcuate path so that a departure axis of the pipeline is more vertical than horizontal. The S-lay apparatus of the vessel comprises a fixed clamp and a travelling clamp mounted on the deck of the vessel. These are used to feed the pipeline along the S-lay pipe-laying path. The vessel can also comprise J-lay apparatus mounted above the lower end of the stinger, substantially aligned with the departure axis of the pipeline so as to facilitate handing over the suspended pipeline between the S-lay apparatus and the J-lay apparatus such that different parts of the same pipeline can be fabricated and laid by the different types of apparatus.

WO 2006/085739 A1 (FIGS. 8, 9 and 10) discloses a pipe-laying vessel for S-laying a pipeline. The vessel includes two track tensioners for supporting the weight of the pipeline and for controlling passage of the pipeline. The vessel also comprises a fixed clamp, located at an upper end of a stinger. The vessel is capable of efficiently S-laying pipeline during routine pipe-laying operations.

When an accessory is to be added to the pipeline, the fixed clamp clamps the pipeline and supports the weight of the suspended pipeline downstream of it. The pipeline is then severed upstream of the fixed clamp. The upstream section of pipeline that has been severed from the suspended pipeline is then moved upstream by the track tensioners. An accessory is then lowered into position at the top end of the suspended pipeline (i.e. the end of the pipeline on the upstream side of the fixed clamp). The accessory is then welded to the top end of the suspended pipeline. The severed pipeline is then moved downstream by the track tensioners to meet the accessory and the accessory is welded to the downstream end of the severed pipeline. The fixed clamp is then released. The pipeline (with the accessory) can then be laid as normal by controlling its passage with the track tensioners.

The vessel described in WO 2006/085739 can also be used to abandon a pipeline. In some cases, this may need to be done where there is a bad weather condition or because the laying operation is completed. In these cases, an end terminal (or abandonment head) is welded to the end of the suspended pipeline in a similar way to the accessory above. The end terminal is then attached to an abandonment and recovery winch using a cable. The fixed clamp is then released. The pipeline and end terminal are then lowered to the seabed using the winch.

However, in cases where the pipeline is damaged and water has entered the pipeline, the tension to be accommodated may be unusually high and the tensioners and/or the abandonment and recovery winch may not be able to support the additional weight of the water-filled pipeline, unless they are specifically designed to do so. That may require, a larger number of track tensioners to be provided, or a larger capacity winch to be provided.

WO 01/48410 A1 discloses a method of abandoning a pipeline using an abandonment and recovery system. The suspended pipeline is initially held by a pipe-laying and tensioning arrangement. Then a series of light, elongate members including one or more buoyant members are attached to the end of the suspended pipeline. The elongate members are then lowered into the sea using a winch and cable. At least one of the elongate members is pivotable with respect to the pipeline. At least one of the pivotable elongate members is buoyant so that the end of the elongate member at the end of the pipeline projects upwardly from the seabed. The elongate members can then be disconnected from the winch cable by remote actuation of a locking mechanism.

The present invention aims to improve on the methods of pipe-laying described above. In particular, the present invention aims to facilitate the abandonment of a pipeline that has been damaged and/or facilitate the adding of an accessory or end terminal to the pipeline.

SUMMARY

According to a first aspect of the invention, there is provided a pipe-laying vessel for S-laying a pipeline, the vessel defining a pipe-laying path extending along the vessel, the vessel comprising one or more track tensioners disposed along the pipe-laying path, and a travelling clamp assembly comprising a clamp mounted for movement along a length of the pipe-laying path. The provision of both track tensioners and a travelling clamp assembly allows the track tensioners to be used for S-laying a pipeline (routinely) and the travelling clamp assembly to be used in special situations, for example, for lowering an end terminal or other abandonment end of an accessory. Hence, routine S-laying can be carried out in a normal way using track tensioners but the vessel also provides a travelling clamp for use in particular operations.

Preferably, at least an upstream portion of the pipe-laying path extends substantially horizontally along the vessel. More preferably, the upstream portion of the pipe-laying path extends along the vessel at an angle of less than 20 degrees, more preferably less than ten degrees to the horizontal.

Preferably, the vessel further comprises a fixed clamp assembly located on the pipe-laying path for clamping the pipeline in a fixed position on the pipe-laying path. The fixed clamp assembly can be used in conjunction with the travelling clamp assembly, for example, to lay a section of pipeline including an accessory or to abandon a pipeline. Preferably the fixed clamp assembly is able to accommodate a greater tension in the pipeline than the track tensioners. It may, for example, be able to accommodate the weight of a pipeline filled with water as may, for example, occur in the case of a wet buckle. An alternative, less preferred, option to providing a fixed clamp assembly is to provide a second travelling clamp assembly.

The fixed clamp assembly may comprise a friction clamp and/or a collar clamp. In a preferred embodiment of the invention described below, the fixed clamp assembly comprises both a friction clamp and a collar clamp. An alternative arrangement, which may be advantageous in certain cases, is for both a friction clamp and a collar clamp to be provided but for them to be spaced apart from one another.

Preferably, the track tensioners are positioned downstream of the travelling clamp assembly on the pipe-laying path. Preferably, in the case where a fixed clamp assembly is provided, it is provided downstream of the travelling clamp assembly and preferably the track tensioners are positioned upstream of the fixed clamp assembly on the pipe-laying path.

Preferably, the travelling clamp assembly includes a collar clamp, the collar clamp being moveable between an operative position, in which it is adjustable between a closed and an open condition, and an inoperative position. Preferably the collar clamp is raised to move it from the inoperative position to the operative position.

Preferably, the pipe-laying path of the vessel includes an upstream portion that is substantially horizontal and, towards a first end of the vessel hull, a downstream portion that is downwardly inclined and the vessel includes, in a region of the first end, separate portions on opposite sides of the pipe-laying path defining a recess that is open at a first end of the vessel hull.

Preferably, the vessel further includes an internal ramp which defines a part of the pipe-laying path and which is located at a downstream end of the vessel.

Preferably the clamp assembly, or at least one of the clamp assemblies, comprises: a load bearing structure, and a clamp wherein a downstream-facing portion of the clamp is in an abutting relationship with an upstream-facing portion of the load bearing structure such that a downstream force exerted, in use, by the pipeline on the clamp is transmitted to the load bearing structure. This removes the need for the clamp to have a mounting structure which is able to transmit loads to the vessel.

Preferably the load bearing structure is adjustable between a closed condition in which it surrounds the pipe-laying path and an open condition in which an opening is provided to one side of the pipe-laying path extending radially outwardly from the pipe-laying path to the exterior of the structure, and the clamp is adjustable between a closed condition in which it surrounds the pipe-laying path and an open condition in which an opening is provided to one side of the pipe-laying path extending radially outwardly from the pipe-laying path to the exterior of the structure, such that when both the load bearing structure and the clamp are in their respective open conditions, they both provide an opening to the same side of the pipeline. This enables an accessory on the pipeline to be passed through the clamp assembly and/or allows the pipeline to be removed from the clamp assembly through the openings.

Preferably the clamp assembly, or at least one of the clamp assemblies, comprises: a base structure, and a clamp wherein the clamp is movably mounted on the base structure such that the clamp can move to align with the pipe-laying path as it moves. Especially in a case where the clamp assembly is provided on a curved portion of the pipe-laying path, the exact position of the pipe-laying path may alter according to the laying conditions. By allowing the clamp assembly to move and maintain alignment with the pipeline, large transverse stresses on the pipeline and clamp assemblies can be avoided. The clamp may be pivotally mounted on the base structure.

The mounting of the clamp preferably supports a major portion of the weight of the clamp. The mounting preferably allows the clamp to "float" on the pipeline, in use. By allowing the clamp assembly to float in this way, large transverse stresses on the pipeline and the clamp assembly can be avoided.

The preferred forms of clamp assemblies provided on the vessel defined above are themselves novel and inventive and need not be used on a pipe-laying vessel as defined above. Accordingly, in a second aspect, the invention provides a clamp assembly for clamping a pipeline on a pipe-laying vessel, the clamp assembly comprising: a load bearing structure, and a clamp wherein a downstream-facing portion of the clamp is in an abutting relationship with an upstream-facing portion of the load bearing structure such that a downstream force exerted, in use, by the pipeline on the clamp is transmitted to the load bearing structure. By providing such an abutting relationship and the load bearing structure, the need for the clamp to have a mounting structure which is able to transmit loads to the vessel is removed.

According to a third aspect of the invention, there is provided a fixed clamp assembly for clamping a pipeline in a fixed position on a pipe-laying path of a pipe-laying vessel, wherein the fixed clamp assembly comprises a friction clamp, and a collar clamp. By providing both a friction clamp and a collar clamp an especially versatile clamping arrangement can be provided and by providing them both in the same assembly certain mounting components for the clamps can be shared, saving space and cost.

Preferably, the friction clamp and the collar clamp are located adjacent to each other.

Preferably, the fixed clamp assembly further comprises a load bearing structure. Preferably, an upstream-facing portion of the load bearing structure is in an abutting relationship with a downstream-facing portion of a first clamp of the collar clamp/friction clamp such that a downstream force exerted by the pipeline on the first clamp is transmitted to the load bearing structure. This removes the need for the friction clamp/collar clamp to have a mounting structure which is able to transmit loads to the vessel.

Preferably, a downstream-facing portion of a second, other clamp is in an abutting relationship with an upstream-facing portion of the first clamp of the collar clamp/friction clamp such that any downstream force exerted by the pipeline on the second clamp is transmitted to the first clamp and then to the load bearing structure. Again this removes the need for the second clamp to have a mounting structure which is able to transmit loads to the vessel.

Preferably, the first clamp is the friction clamp and the second clamp is the collar clamp.

Preferably, the load bearing structure is adjustable between a closed condition in which it surrounds the pipe-laying path and an open condition in which an opening is provided to one side of the pipe-laying path extending radially outwardly from the pipe-laying path to the exterior of the structure, a first clamp of the friction clamp/collar clamp is adjustable between a closed condition in which it surrounds the pipe-laying path and an open condition in which an opening is provided to one side of the pipe-laying path extending radially outwardly from the pipe-laying path to the exterior of the structure, such that when the load bearing structure and the first clamp are in their respective open conditions, they both provide an opening to a same side of the pipe-laying path. Preferably, a second, other clamp of the friction clamp/collar clamp is adjustable between a closed condition in which it surrounds the pipe-laying path and an open condition in which an opening is provided to one side of the pipe-laying path, such that when both clamps and the load bearing structure are in their respective open conditions, they all provide an opening to the same side of the pipeline. This allows an accessory on the pipeline to pass the clamp assembly. Alternatively or additionally, it allows the pipeline to be removed from the clamp assembly through the openings.

Preferably, the friction clamp and/or collar clamp and/or load bearing structure are adjusted between the closed condition and open condition by opening a hinged portion of the clamp or structure.

Preferably, the fixed clamp assembly comprises a base structure for mounting the friction clamp and collar clamp and the friction clamp and/or collar clamp is movably mounted on the base structure such that it can move to align with the pipe-laying path, as it moves. Especially in a case where the clamp assembly is provided on a curved portion of the pipe-laying path, the exact position of the pipe-laying path may alter according to the laying conditions. By allowing the clamp assembly to move and maintain alignment with the pipeline, large transverse stresses on the pipeline and the clamp assembly can be avoided.

Preferably, the friction clamp and/or collar clamp are mounted on the load bearing structure and the load bearing structure is movably mounted on the base structure.

Preferably, the movable mounting of the friction clamp and/or collar clamp and/or load bearing structure comprises a pivotal mounting on the base structure.

Preferably, the fixed clamp assembly comprises one or more adjustable supports for supporting at least a major portion of the weight of the movably mounted friction clamp and/or collar clamp and/or load bearing structure in various configurations.

The structure of the travelling clamp assembly is itself a novel and inventive aspect of the invention. Accordingly, a fourth aspect of the invention provides a travelling clamp assembly for clamping a pipeline on a pipe-laying vessel, wherein the travelling clamp assembly comprises a base structure, and a clamp moveably mounted on the base structure, such that the clamp can move reciprocally along a length of a pipe-laying path to lay the pipeline.

Preferably, the clamp is a collar clamp.

Preferably, the travelling clamp assembly further comprises a load bearing structure. Preferably, an upstream-facing portion of the load bearing structure is in an abutting relationship with a downstream-facing portion of the clamp such that any downstream force exerted by the pipeline on the clamp is transmitted to the load bearing structure.

Preferably, the load bearing structure is adjustable between a closed condition in which it surrounds the pipe-laying path and an open condition in which an opening is provided to one side of the pipe-laying path extending radially outwardly from the pipe-laying path to the exterior of the structure, and the clamp is adjustable between a closed condition in which it surrounds the pipe-laying path and an open condition in which an opening is provided to one side of the pipe-laying path extending radially outwardly from the pipe-laying path to the exterior of the structure, such that when both the load bearing structure and the clamp are in their respective open conditions, they both provide an opening to the same side of the pipeline.

The clamp may be movably mounted on the base structure such that the clamp can move to align with the pipe-laying path, as it moves. The clamp may be pivotally mounted on the base structure.

The clamp may be mounted on the load bearing structure and the load bearing structure may be movably mounted on the base structure. The load bearing structure may be pivotally mounted on the base structure.

Preferably, the clamp is moveably mounted on the base structure such that the clamp can be moved between an operative position, where it is located on the pipe-laying path, and an inoperative position, where it is located off the pipe-laying path. Preferably, the clamp is pivotally mounted on the base structure such that the clamp can be pivoted between an operative position, where it is located on the pipe-laying path, and an inoperative position, where it is located off the pipe-laying path. Preferably, the clamp is moved downwardly to move into the inoperative position.

Preferably, the clamp is mounted on the base structure via one or more extendable hydraulic piston and cylinder arrangements such that the clamp can be moved along a length of the pipe-laying path by extending and retracting the hydraulic piston and cylinder arrangements.

The invention further provides a pipe-laying vessel including a clamp assembly of any of the kinds defined above.

According to a further aspect of the invention, there is provided a method of S-laying a pipeline from a pipe-laying vessel, the method comprising the step of providing a vessel defining a pipe-laying path extending along the vessel, the method further comprising the steps of laying the pipeline using track tensioners disposed on the pipe-laying path during a first time interval, and laying or abandoning the pipeline using a travelling clamp assembly disposed on the pipe-laying path during a second time interval. Preferably the first and second time intervals do not overlap.

According to a still further aspect of the invention, there is provided a method of S-laying a pipeline from a pipe-laying vessel, the method comprising the step of providing a vessel defining a pipe-laying path extending along the vessel, the method further comprising the steps of providing an accessory or end terminal on a section of the pipeline, and laying or abandoning the section of the pipeline using a travelling clamp assembly, and a fixed clamp assembly disposed on the pipe-laying path.

The method may employ a vessel of any of the kinds defined above.

In the description above various vessels, clamps and methods of laying a pipeline according to different aspects of the invention have been described. It should be understood that features described above with reference to one aspect of the invention can be incorporated in another aspect of the invention. Indeed, in an embodiment of the invention described below, almost all of the features referred to above are incorporated in a single design.

BRIEF DESCRIPTION OF THE DRAWINGS

By way of example, an embodiment of the invention will now be described with reference to the accompanying schematic drawings, of which.

DETAILED DESCRIPTION OF EMBODIMENTS

Figure 1:
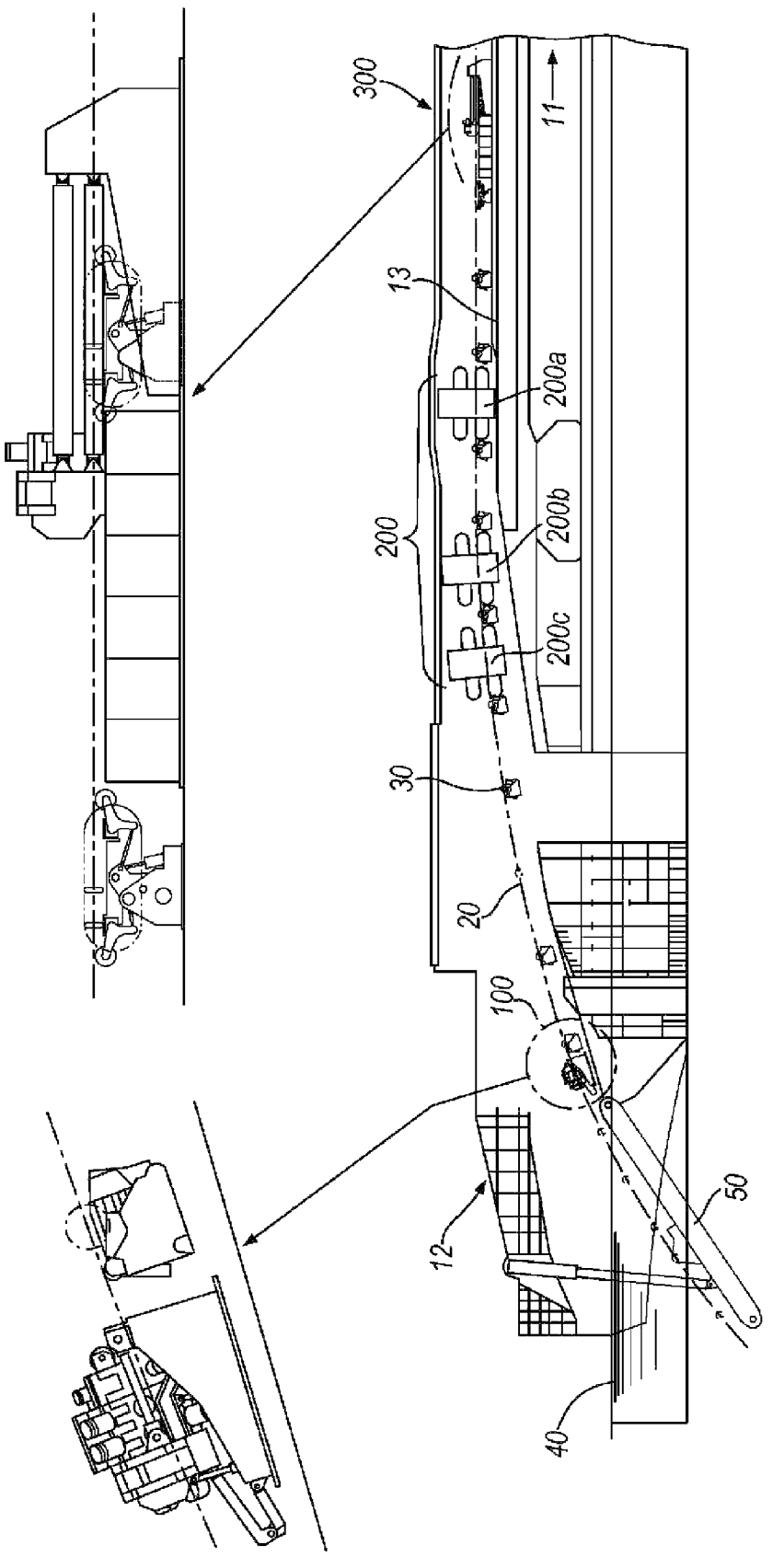
FIG. 1 is a schematic side view from the starboard side of the stern portion of a pipe-laying vessel.

Referring first to FIG. 1, a pipe-laying vessel indicated generally by the reference numeral 10 is a pipe-laying vessel for S-laying a pipeline. The vessel may be generally of the form shown in WO 2008/107186, the description of which is incorporated herein by reference. The vessel 10 includes equipment appropriate for the operation of a pipe-laying vessel, but the description below will be limited mainly to a description of the pipe-laying apparatus and, especially, special features of that apparatus.

A pipe-laying path 20 (also called a firing line) is the path followed by a pipeline 30 when laid. The pipe-laying path 20 is horizontal towards a bow end 11 of the vessel and runs over a deck 13 of the vessel. The pipe-laying path 20 angles downwards towards a stern end 12 of the vessel, reaching an angle in the range of about 25 to 55 degrees to the horizontal when entering the water 40.

The pipeline 30 is guided along the pipe-laying path 20 by various apparatus, which will be described below.

Towards the bow end 11 of the vessel, is a travelling clamp assembly 300. This is shown in more detail in FIGS. 4 to 7 and described below. On the bow side (upstream) of the travelling clamp assembly 300 are one or more welding stations (not visible in the drawings) where, during routine pipe-laying, new sections of pipe are welded to the pipeline.

On the stern side (downstream) of the travelling clamp assembly 300 is a group of track tensioners 200. The track tensioner group has three track tensioners 200a, 200b, 200c spaced along the pipe-laying path 20. The first track tensioner 200a is positioned on the pipe-laying path 20 at a location where the pipe-laying path 20 is substantially horizontal. The second track tensioner 200b is located further downstream than the first track tensioner 200a and is located on the pipe-laying path 20 in a location where the pipe-laying path 20 has started to angle downwardly. The third track tensioner 200c is downstream of the second track tensioner 200b and is adjacent to it. The third track tensioner 200c is located at a location where the pipe-laying path 20 is at a greater downward angle than at the second track tensioner 200b.

The track tensioners 200a, 200b, 200c are conventional. During operation of the track tensioners 200, two or more of the track tensioners 200a, 200b, 200c support the weight of the pipeline 30 and control the paying out of the pipeline 30. In the particular example described, the tensioners are capable of supporting a tension load of 250 tonnes each so that the three tensioners together can accommodate a tension of 750 tonnes.

On the stern side (downstream) of the track tensioner group 200 is a fixed clamp assembly 100. This is shown in more detail in FIGS. 2 and 3 and described below.

On the stern (downstream) side of the fixed clamp assembly 100 is a stinger 50. The stinger 50 is mounted to the stern end 12 of the vessel 10. The stinger 50 is used to divert the pipe-laying path 20 so it angles downwardly at the stern end 12 of the vessel 10.

Figure 2:
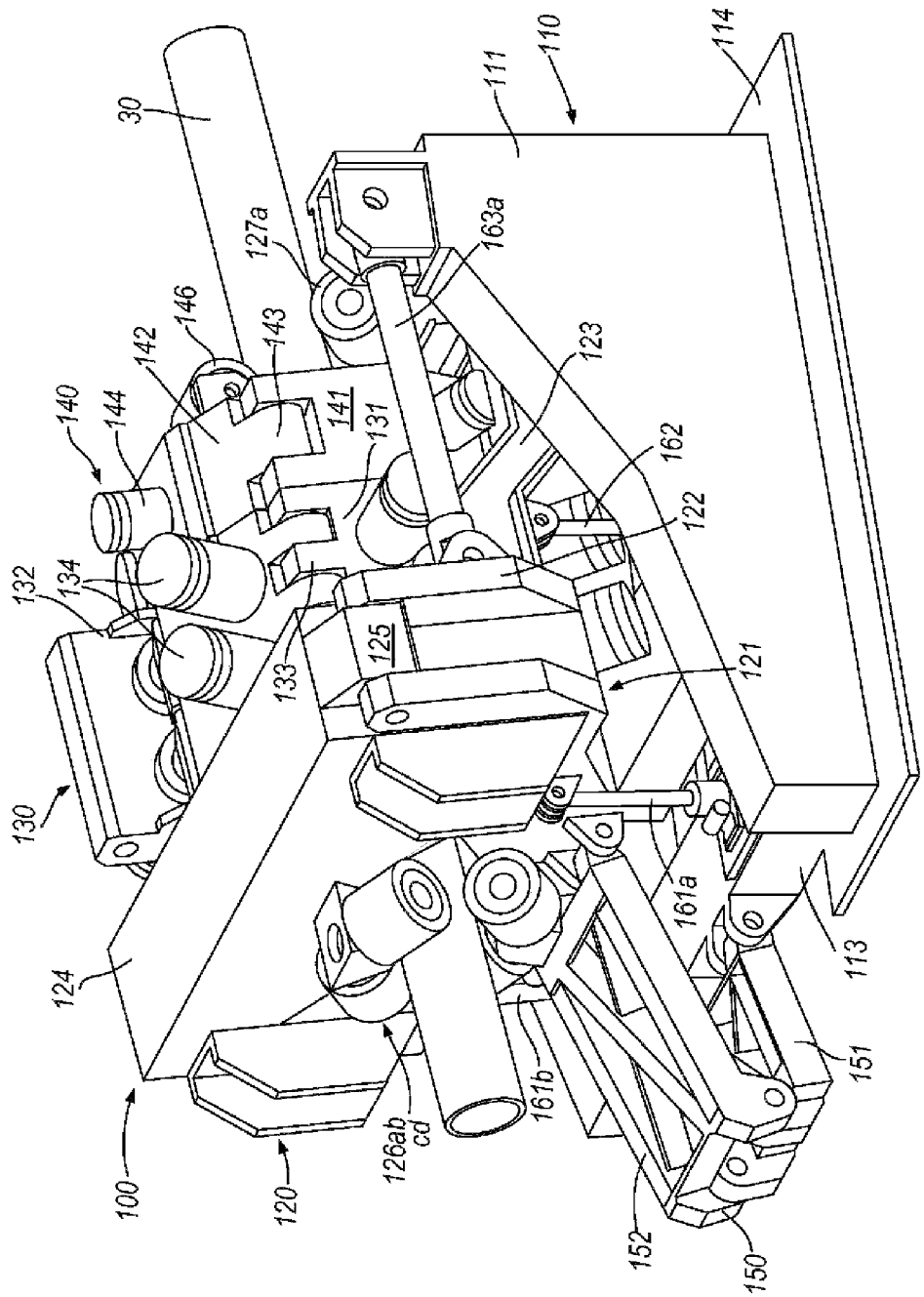
FIG. 2 is a front perspective view of a fixed clamp assembly including a section of pipeline.

FIG. 2 shows the fixed clamp assembly 100. The fixed clamp assembly has a base portion 110. The base portion 110 has a flat underside and flange portions 114 for securing the base portion 110 to the vessel 10. The base portion 110 also has two generally upright members 111, 112 on either side of the base portion 110. Extending between the upright members 111, 112 is a joining portion 113.

A load bearing structure 120 is mounted between the upright members 111, 112 and above the joining portion 113. The load bearing structure comprises a lower portion 121. The lower portion 121 has two portions: a front lower portion 122 and a rear lower portion 123. The front lower portion generally takes the form of an upright V shape, which surrounds an underside of a pipeline 30 in the clamp assembly 100. The rear lower portion 123 generally takes the form of a horizontal U shape. It extends rearwardly from the bottom of the rear of the front lower portion 122. The load bearing structure 120 also includes an upper portion 124 which is mounted at a hinge 125 to the top of one of the uprights of the V shaped front lower portion 122. The upper portion 124, when in its closed position, meets both uprights of the V shaped front lower portion 122 so as to close around the pipeline 30. The underside of the upper portion 124 forms an inverted V shape. When in the closed position, this co-operates with the upright V shape of the front lower portion 122 to form an opening, through which the pipeline 30 passes.

Two rollers 126 c, d are mounted at an angle to each other on the front lower portion 122 so as to form a V shape to correspond to the V shape of the front lower portion 122. The roller 126 c, d are mounted so the upper rolling surfaces of the rollers 126 c, d are above the surfaces of the V shape of the front lower portion 122. Similarly, two rollers 126 a, b are mounted at an angle to each other on the upper portion 124 so as to form an inverted V shape to correspond to the inverted shape of the upper portion 124. The rollers 126 a, b are mounted so the lower rolling surfaces of the rollers 126 a, b are below the surfaces of the inverted V shape on the upper portion 124. The four rollers 126 a, b, c, d form a diagonal shaped opening, through which the pipeline 30 passes. The rollers 126 a, b, c, d are therefore able to be in contact with the outside surface of the pipeline 30.

Figure 3:
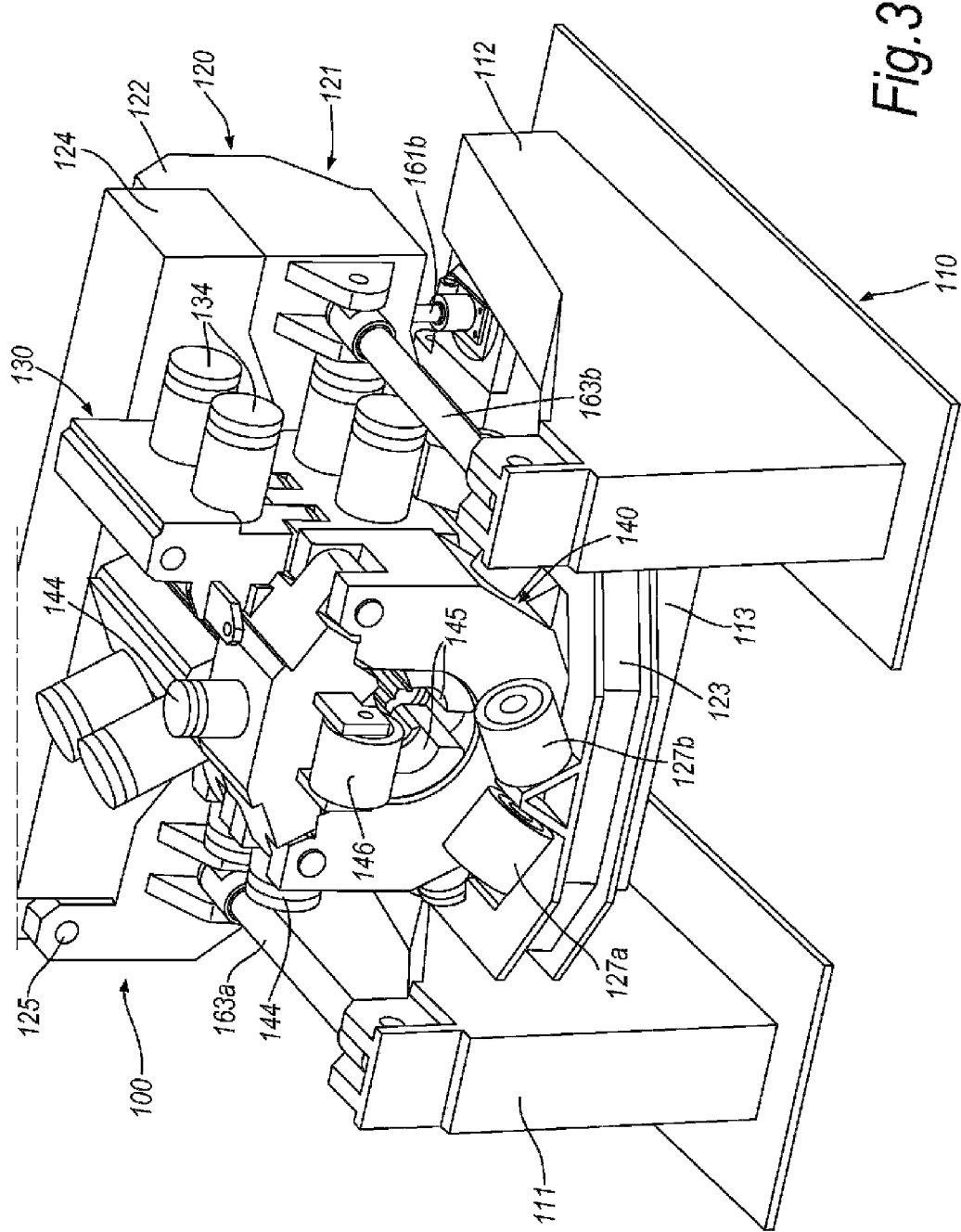
FIG. 3 is an enlarged rear perspective view of part of the fixed clamp assembly of FIG. 2.

As can be seen in FIG. 3, two rollers 127 a, b are also mounted on the upper surface of the rear lower portion 123. The rollers 127 a, b are mounted at an angle to each other so as to form a V shape that can be brought into contact with the pipeline 30.

The fixed clamp assembly also includes a friction clamp 130. The friction clamp 130 has an opening passing through the centre. The friction clamp 130 is mounted to the rear of the lower front portion 122 of the load bearing structure 120 so that the opening aligns with the diagonal shape formed by the rollers 126 a, b, c, d. The friction clamp 130 has a lower portion 131, which has a generally upright U shape construction and an upper portion, 132 which sits on both uprights of the lower portion 131 so as to close the opening. The upper portion 132 is attached to the lower portion 131 by a hinge 133. The hinge 133 allows the upper portion 132 to be moved from a closed position, where it co-operates with the lower portion 131 to close the opening, to an open position where the opening is open at its top.

The friction clamp 130 has 12 hydraulic cylinders 134 mounted around the lower 131 and upper 132 portions of the friction clamp 130. The friction clamp 130 also has friction pads (not shown) located around the inside surface of the opening. The hydraulic cylinders 134 push the friction pads inwardly. The faces of the friction pads are shaped (for example, by knurling or notches) so that they slightly indent the pipeline 30 when they are pushed inwardly. Hence, they can be pressed into engagement with a pipeline 30 which is surrounded by the friction clamp 130 and can then accommodate a large tension load. In the particular example described, they can accommodate a load of 1500 tonnes.

The fixed clamp assembly 100 also includes a collar clamp 140 having a generally disc-like shape with an opening passing through the centre. The collar clamp 140 is mounted to the rear of the friction clamp 130. The collar clamp 140 has a lower portion 141, which has a generally upright U shape construction and corresponds to the U shape of the lower portion 131 of the friction clamp 130. The collar clamp 140 also has an upper portion 142 so as to close the opening. The collar clamp 140 is mounted on the rear of the friction clamp 130 so that the opening of the collar clamp 140 aligns with the diagonal shape formed by the rollers 126 a, b, c, d and the opening of the friction clamp 130. The upper portion 142 of the collar clamp 140 is attached to the lower portion 141 by a hinge 143. The hinge 143 allows the upper portion 142 to be moved from a closed position, where it co-operates with the lower portion 141 to close the opening, to an open position where the opening is open at its top.

The collar clamp 140 has 3 hydraulic cylinders 144 mounted around the lower 141 and upper 142 portions of the collar clamp 140. The collar clamp 140 also has 3 contact pads 145 located around the inside surface of the opening of the collar clamp 140. The hydraulic cylinders 144 push the contact pads 145 inwardly so as contact the pipeline 30 surrounded by the collar clamp 130. The pads 145 are not designed to apply pressure to the pipeline and may not even be in engagement with the pipeline when in their innermost position but are designed to engage a collar (not shown) on the pipeline.

The load bearing structure 120 is attached to the base structure 110 in three ways.

Firstly, an articulated hinge 150 is connected between the bottom of the front lower portion 122 of the load bearing structure 120 and the front of the joining portion 113 of the base portion 110. The articulated hinge 150 has two portions; a lower hinge portion 151 and an upper hinge portion 152. The two hinge portions 151, 152 are pivotally connected to each other at first ends. The second end of the lower hinge portion 151 is pivotally mounted to the front of the joining portion 113 of the base portion 110. The second end of the upper hinge portion 152 is pivotally mounted to the front lower portion 122 of the load bearing structure 120.

Secondly, the load bearing structure 120 is supported above the joining structure 113 by 2 front hydraulic struts 161 and two rear hydraulic struts 162. The two front hydraulic struts 161 a, b are pivotally connected at their lower ends to the top of the front of the joining structure 113, either side of the articulated hinge 150. The front hydraulic struts 161 a, b extend substantially vertically and are pivotally connected at their upper ends to the front lower portion 122 of the load bearing structure 120. The two rear hydraulic struts 162 a, b are attached at their lower ends to the top of the joining structure 113. The two rear hydraulic struts 162 a, b line up with the two front hydraulic struts 161 a, b. The rear hydraulic struts 162 a, b extend substantially vertically and are pivotally connected at their upper ends to an underside of the rear lower portion 123 of the load bearing structure 120 at a second end.

Thirdly, the load bearing structure is connected to the upright members 111, 112 of the base portion 110 by two tension rods 163 a, b. A first tension rod 163a is pivotally connected to one side of a rear face of the front lower portion 122 of the load bearing structure 120 at one end. The opposite end of the first tension rod 163a is pivotally connected to an upper portion of the first upright member 111. Similarly, the second tension rod 163b is pivotally connected to the other side of the rear face of the front lower portion 122 of the load bearing structure 120 at one end. The opposite end of the second tension rod 163a is pivotally connected to an upper portion of the second upright member 112.

Figure 4:
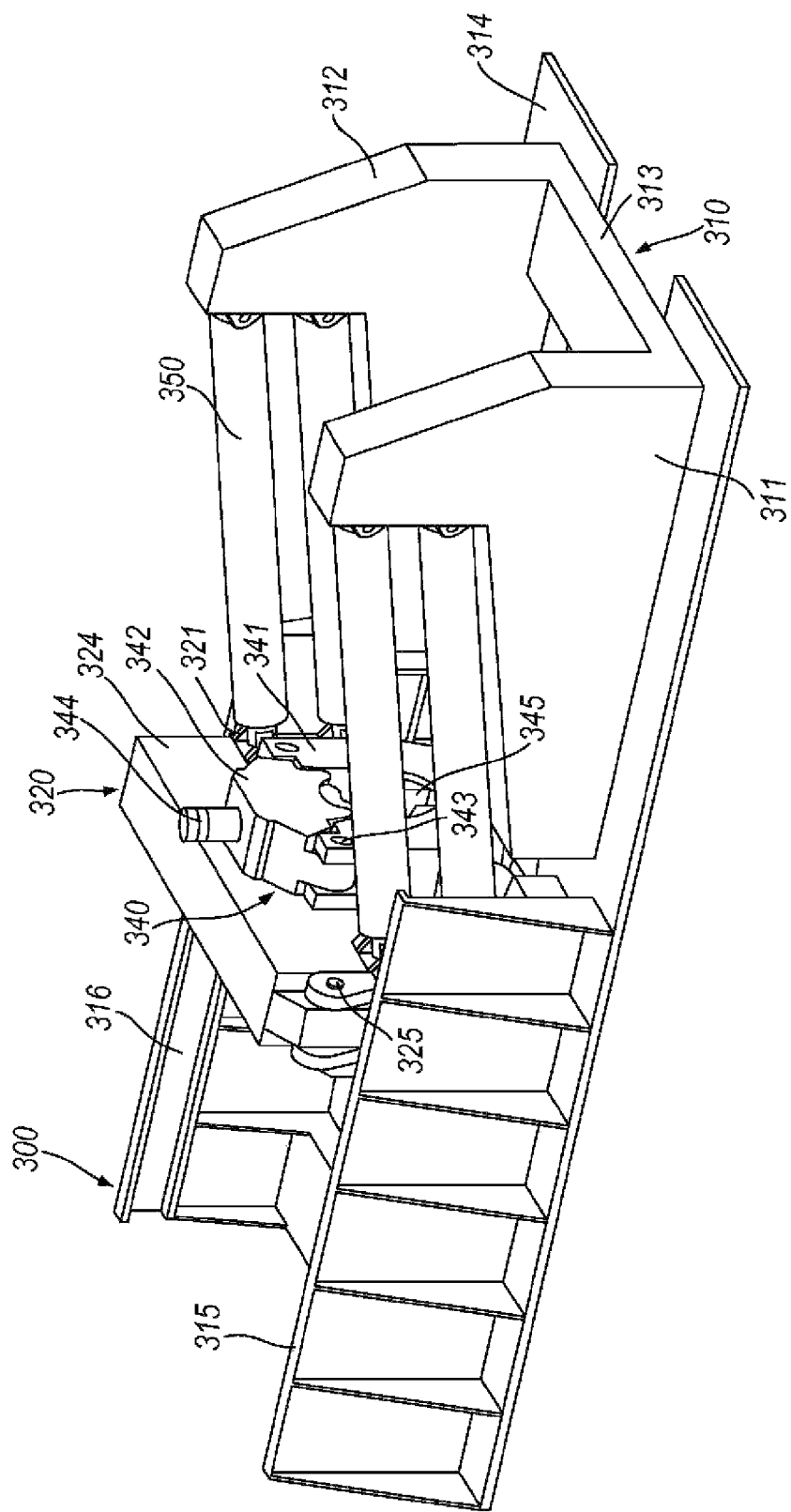
FIG. 4 is a rear perspective view of a travelling clamp assembly in an inoperative position.

FIG. 4 shows the travelling clamp assembly 300 in its inoperative position. The travelling clamp assembly 300 has a base portion 310. The base portion has a flat underside and flange portions 314 for securing the base portion 310 to the vessel 10. The base portion 310 also has two generally upright members 311, 312 on either side of the base portion 310. Extending between the upright members 311, 312 is a joining portion 313.

The base portion 310 also has two rails 315, 316 running parallel to each other along a section of the length of the base portion 310.

A load bearing structure 320 is movably mounted on the base portion 310. The load bearing structure 320 comprises a lower portion 321, which generally takes the form of an upright V shape, which surrounds an underside of a pipeline 30 in the clamp assembly 300. The load bearing structure 320 also includes an upper portion 324 which is mounted at a hinge 325 to the top of one of the uprights of the V shaped lower portion 321. The upper portion 124, when in its closed position, meets both uprights of the V shaped lower portion 321 so as to close around a pipeline disposed in the V shape of the lower portion 321. The underside of the upper portion 324 forms an inverted V shape. When in the closed position, this co-operates with the upright V shape of the lower portion 321 to form an opening, through which the pipeline 30 passes.

The travelling clamp assembly 300 also includes a collar clamp 340. The collar clamp 340 has a generally disc-like shape with an opening passing through the centre. The collar clamp 340 is mounted on the rear of the load bearing structure 320. The collar clamp 340 has a lower portion 341, which has a generally upright U shape construction. The collar clamp 340 also has an upper portion 342 so as to close the opening. The collar clamp 340 is mounted on the rear of the load bearing structure 320 so that the opening of the collar clamp 340 aligns with the opening formed by the lower 321 and upper 324 portions of the load bearing structure 320. The upper portion 342 of the collar clamp 340 is attached to the lower portion 341 by a hinge 343. The hinge 343 allows the upper portion 342 to be moved from a closed position, where it co-operates with the lower portion 341 to close the opening, to an open position where the opening is open at the top.

The collar clamp 340 has 3 hydraulic cylinders 344 mounted around the lower 341 and upper 342 portions of the collar clamp 340. The collar clamp 340 also has 3 contact pads 345 located around the inside surface of the opening of the collar clamp 340. The hydraulic cylinders 344 push the contact pads 345 inwardly so as to contact the pipeline 30 surrounded by the collar clamp 340. The pads 345 are not designed to apply pressure to the pipeline and may not even be in engagement with the pipeline when in their innermost position but are designed to engage a collar (not shown) on the pipeline.

The load bearing structure 320 is attached to the base portion 310 in two ways.

Firstly, the load bearing structure 320 is connected to the upright members 311, 312 of the base portion 310 by 4 hydraulic piston and cylinder arrangements 350. Two of the hydraulic piston and cylinder arrangements are each pivotally connected at a first end to an upper portion of the first upright member 311. At a second opposite end, each of the two hydraulic piston and cylinder arrangements are pivotally connected to one side of the lower portion 321 of the load bearing structure 320. Similarly, the other two hydraulic piston and cylinder arrangements are each pivotally connected at a first end to an upper portion of the second upright member 312. At a second opposite end, each of the two hydraulic piston and cylinder arrangements are pivotally connected to the other side of the lower portion 321 of the load bearing structure 320. In the particular example described, the stroke length of the hydraulic pistons 350 between an original (non-extended) position and a fully extended position is 6 meters.

Secondly, the load bearing structure 320 includes rail portions 326 protruding rearwardly from the lower portion 321 on each side of the load bearing structure 320. When the travelling clamp assembly 300 is in an operative position (such as in FIG. 5 or 6), these rail portions 326 engage in rails 315, 316 of the base portion 310 and the rails 315, 316 support the weight of the load bearing structure 320.

Figure 5:
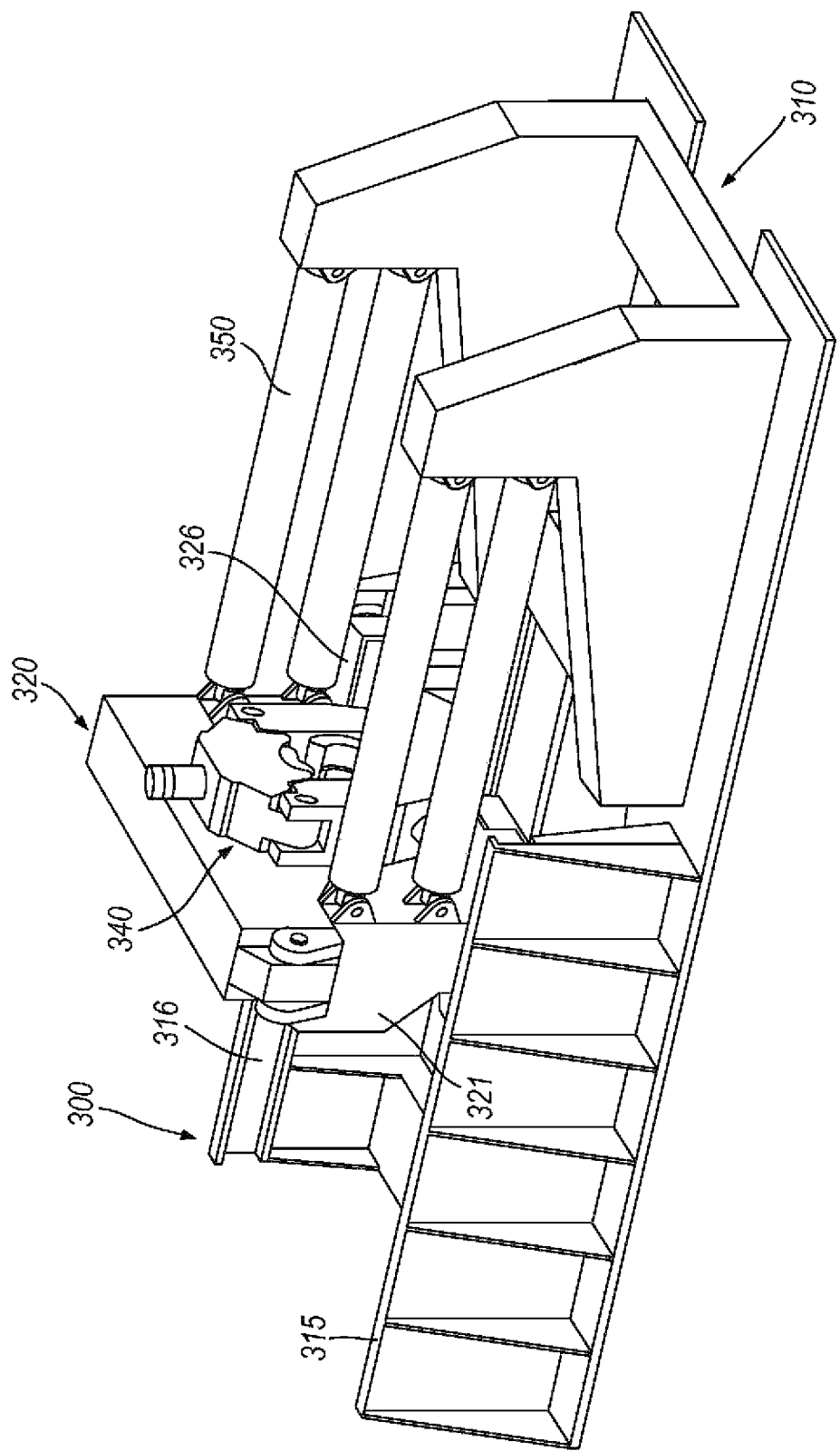
FIG. 5 is a rear perspective view of the travelling clamp assembly of FIG. 4 in an operative, non-extended position.
Figure 6:
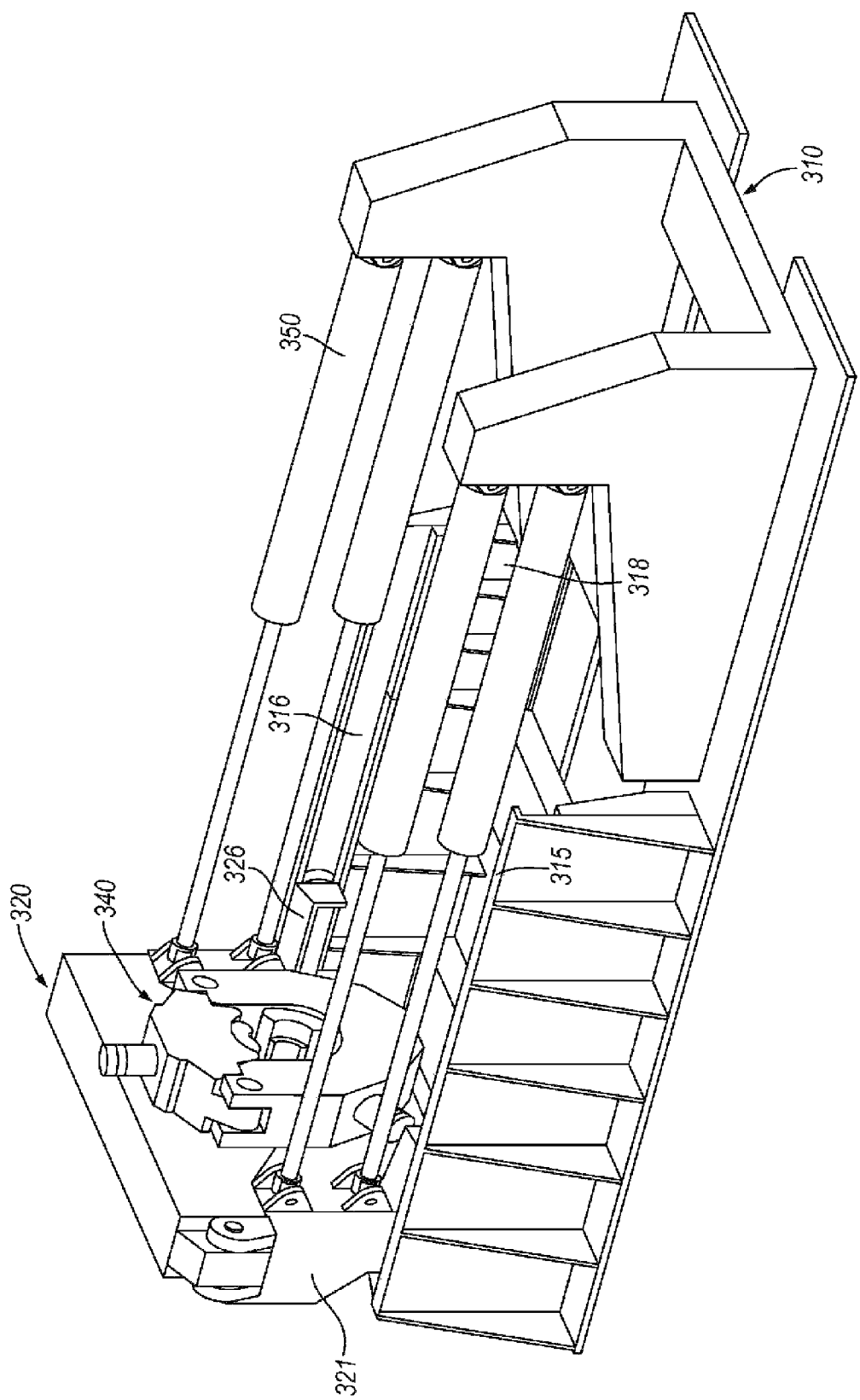
FIG. 6 is a rear perspective view of the travelling clamp assembly of FIGS. 4 and 5 in an operative, extended position.

When the travelling clamp assembly 300 is in its inoperative position (as shown in FIG. 4), the load bearing structure 320 and collar clamp 340 are below the pipe-laying path 20. Hence, when the travelling clamp assembly 300 is not being used, it does not interfere with the pipe-laying path 20. The travelling clamp assembly 300 can be moved to its operative position from the position shown in FIG. 4 by actuating the hydraulic piston and cylinder arrangements 350 to lift the load bearing structure 320 and collar clamp 340 onto the pipe-laying path, as shown in FIG. 5. Once the load bearing structure 320 has been raised onto the upper portions of the rails 315, 316, gusset plates 318 are put in the position shown in FIG. 6 so that the load bearing structure remains at its higher level.

In the operative position of the travelling clamp assembly shown in FIG. 5, the hydraulic piston and cylinder arrangements 350 can be extended. This causes the load bearing structure 320 (and consequently, the collar clamp 340) to move along the rails 315, 316 to the extended position. The extended position of the load bearing structure 320 and collar clamp 340 can be seen in FIG. 6.

The vessel 10 also has an abandonment and recovery winch system (not shown).

In normal use, the vessel 10 is capable of S-laying pipeline 30 in a conventional manner using the group of track tensioners 200.

The pipeline 30 is built using pipe joints (lengths of pipe) that are welded to the end of the pipeline at various working stations on the vessel 10 upstream of the travelling clamp assembly 300. The pipeline 30 is then fed through the track tensioners 200a, 200b, 200c and over the stinger 50.

The tensioners accommodate the tension in the pipeline by the frictional force applied between the tensioners and the pipeline 30. The speed of the track tensioners 200a, 200b, 200c is controlled so that the track tensioners 200a, 200b, 200c control passage of the pipeline 30 so it is fed out at a desired speed. The vessel 10 moves at a corresponding distance in order to maintain the desired configuration of the pipe-laying path 20. The track tensioners 200a, 200b, 200c are designed to support a tension created by the usual operational weight of the pipeline 30. During use, not all the tensioners 200a, 200b, 200c have to be used at once. For example, if during a particular laying operation, two of the tensioners have a combined capacity that exceeds the operational weight, the third tensioner does not have to be used at the same time.

During normal use, the fixed clamp assembly 100 is always located on the pipe-laying path 20 with the load bearing structure 120, friction clamp 130 and collar clamp 140 in the closed position. The pads of the clamp are, however, retracted and the pipeline 30 can therefore still pass freely through the fixed clamp assembly 100.

During normal use, the travelling clamp assembly 300 does not interfere with the pipe-laying operation as it is kept in its, lower, inoperative position.

When an accessory is to be added to the pipeline 30, this is done in the following way.

The track tensioners 200a, 200b and 200c are stopped and the fixed clamp assembly 100 operated to clamp the pipeline 30 by activating the hydraulic cylinders 134 to push the friction pads inwardly. The friction pads slightly indent the pipeline 30 to grip it in position and support the weight of the suspended pipeline 30 downstream of the fixed clamp assembly 100. Additionally, a collar or thicker joint can be added to the pipeline 30 where the fixed clamp assembly 100 will clamp the pipeline 30. The fixed clamp assembly 100 can then clamp the pipeline 30 in the area of the collar/thicker joint and prevent damage to the pipeline 30.

The track tensioners 200a, 200b, 200c are then released.

The pipeline 30 is then severed upstream of the fixed clamp assembly 100. The upstream section of pipeline that has been severed from the suspended pipeline 30 is then moved upstream by the track tensioners 200a, 200b, 200c. An accessory (not shown) is then lowered into position at the top end of the suspended pipeline (i.e. the end of the pipeline on the upstream side of the fixed clamp assembly 100). The accessory is then welded to the top end of the suspended pipeline 30.

The severed pipeline is then moved downstream by the track tensioners 200a, 200b, 200c to meet the accessory and the accessory is welded to the downstream end of the severed pipeline. The track tensioners are then operated (with only slight movement) to create a tension in the pipeline between the tensioners and the fixed clamp assembly 100 that is substantially the same as the tension in the pipeline downstream of the fixed clamp assembly 100.

The fixed clamp assembly 100 is then released by releasing hydraulic cylinders 134 and opening the load bearing structure 120, friction clamp 130 and collar clamp 140 so that they are all open at the top.

The pipeline 30 (with the accessory) can then be laid as normal by supporting the weight of the pipeline 30 and controlling its passage with the track tensioners 200a, 200b, 200c. The accessory can pass through the open fixed clamp assembly through the openings of the load bearing structure 120, friction clamp 130 and collar clamp 140.

When a pipeline 30 needs to be abandoned and the weight of the pipeline 30 is such that its weight can be supported by the track tensioners 200a, 200b, 200c and/or the abandonment and recovery winch system (not shown), then abandonment can be carried out without using the travelling clamp, by employing the tensioners.

When a pipeline 30 needs to be abandoned and the tensioners do not have sufficient capacity, for example, if the pipeline has been damaged and water has entered the pipeline 30, the following procedure is carried out:

The fixed clamp assembly 100 clamps the pipeline 30 by activating the hydraulic cylinders 134 to push the friction pads inwardly. This initial operation can be accomplished very quickly because the fixed clamp is already positioned around the pipeline. The friction pads slightly indent the pipeline 30 to grip it in position and support the weight of the suspended pipeline 30 downstream of the fixed clamp assembly 100.

The track tensioners 200a, 200b, 200c are then released and the pipeline 30 is then severed directly upstream of the fixed clamp assembly 100.

Alternatively, the pipeline 30 could be severed as upstream as directly downstream of the travelling clamp assembly 300 (i.e. upstream of the track tensioners 200a, 200b, 200c). In this case, the track tensioners 200a, 200b, 200c are not released prior to the severing of the pipeline 30.

If the pipeline 30 is severed directly upstream of the fixed clamp assembly 100, then the upstream section of pipeline that has been severed from the suspended pipeline 30 is moved upstream by the track tensioners 200a, 200b, 200c.

An end terminal (or abandonment head) is then lowered into position at the top end of the suspended pipeline (i.e. the end of the pipeline on the upstream side of the fixed clamp assembly 100). The end terminal is then welded to the top end of the suspended pipeline 30.

The severed pipeline is then removed from the pipe-laying path 20. The travelling clamp assembly 300 is moved from its inoperative position to its operative position by actuating hydraulic pistons 350 to lift the load bearing structure 320 and collar clamp 340 into the pipe-laying path 20. The collar clamp 340 and load bearing structure 140 are opened. Light buoyant elongate members, such as those described in WO 01/48410 A1, are placed in the pipe-laying path 20 from the travelling clamp assembly 300 to the abandonment head and fixed together, for example by welding. The elongate members have collars spaced at intervals of less than 6 m (the stroke length of the travelling clamp).

The travelling clamp assembly 300 is then closed around the elongate members by closing openings on the load bearing structure 320 and collar clamps 340. The hydraulic cylinders 344 of the collar clamp 340 are then actuated to push the contact pads 345 inwardly so as to engage a collar (not shown) on the pipeline 30. The travelling clamp assembly 300 now takes the tension load of the pipeline (and elongate members) through a collar of one of the elongate members abutting the pads 345 on the collar clamp 340, the collar clamp 340 being moved upstream to engage the collar. This load is then transmitted to the load bearing structure 320, the hydraulic pistons 350 and the base portion 310.

The friction clamp 130 of the fixed clamp assembly 100 is then released by operating the hydraulic cylinders 134. The collar clamp 140 remains closed with the contact pads 145 in their inward position.

The hydraulic pistons 350 of the travelling clamp assembly 300 are actuated to extend until a collar of the elongate members abuts and presses against the contact pads of the collar clamp 140 of the fixed clamp assembly 100, such that the fixed clamp assembly 100 is taking the load of the suspended pipeline 30 and elongate members.

The following steps are then carried out:

(a) The collar clamp 340 of the travelling clamp assembly 300 is then released. The hydraulic cylinders 344 of the collar clamp 340 are actuated so the contact pads 345 move clear of the collar that they were abutting.

(b) The hydraulic pistons 350 are retracted to return the load bearing structure 320 and collar clamp 340 towards the original (non-extended) position.

(c) The collar clamp 340 is then operated again by re-actuating the hydraulic cylinders 344 to move the pads 345 inwardly.

(d) The hydraulic pistons 350 are then further retracted to pull the load bearing structure 320 and collar clamp 340 upstream to meet and take the tension load from a downstream face of a collar on the elongate members.

(e) The collar clamp 140 of the fixed clamp assembly 100 is then released.

(f) The hydraulic pistons 350 of the travelling clamp assembly 300 then extend to allow the elongate members and the pipeline 30 to be moved downstream.

(g) Once a collar of the elongate members has passed through the collar clamp 140 of the fixed clamp assembly 100, the pads 145 of the collar clamp 140 are moved inwardly again.

(h) The hydraulic pistons 350 continue to extend until the next collar of the elongate members reaches and abuts and presses against the pads 145 of the collar clamp 140 of the fixed clamp assembly 100. Hence, the collar clamp 140 of the fixed clamp assembly 100 is taking the tension load of the suspended pipeline 30 and elongate members.

(i) The process in steps (a) to (h) repeats until the operation is complete, with additional elongate members being added upstream of the travelling clamp.

When the weight of the pipeline 30 reduces to a weight manageable by an abandonment and recovery winch system, the friction clamp or the collar clamp of the fixed clamp assembly is operated to clamp the elongate members and support the weight of any suspended pipeline 30 and the elongate members downstream of the fixed clamp assembly 100.

A cable is attached to the end of the elongate members and the elongate members are lowered to the seabed by the abandonment and recovery winch system (not shown). The connection of the cable to the end of the elongate members can then be cut off by remote actuation of a locking mechanism.

In the particular example described above, reference is made to using light buoyant elongate members in the abandonment procedure, but it should be understood that other arrangements are possible. For example, the elongate members need not be buoyant and, for example, may comprise high strength machined steel rods.

For the fixed clamp assembly 100, upward movement of the pipeline leads, via the rollers 126a, b, c and d, 127a, 127b and 146, to corresponding movement of the load bearing structure 120 and causes the hydraulic struts 161 a, b, 162 a, b to extend. The weight of the clamp assembly is taken by the hydraulic struts rather than the pipeline. This ensures that the openings in the fixed clamp assembly 100 align with the pipeline 30 and that no particular lateral force is applied to the pipeline. As a result of the upward movement of the load bearing structure 120, hinge 150 is caused to open up by increasing the angle between the lower hinge portion 151 and upper hinge portion 152. Also, the tension bars 163 a, b are caused to pivot upwards with respect to the base portion 110.

When there is downward movement of the pipeline 30, the reverse happens.

Although, the clamp assembly 100 is referred to as a fixed clamp assembly, this is simply in the sense that the fixed clamp assembly is used for clamping the pipeline 30 without relative movement of the pipeline and the clamp. This is in comparison to the travelling clamp assembly 300, for example, which instead moves reciprocally along the pipe-laying path 20 to lay the pipeline 30. Thus the fixed clamp assembly 100 clamps the pipeline 30 in one position and does not allow the pipeline 30 to progress along the pipe-laying path 20. This does not mean, however, that the fixed clamp assembly 100 itself is completely fixed and prevented from moving.

Instead, as is made clear above, the friction 130 and collar 140 clamps of the fixed clamp assembly 100 are moveably mounted with respect to the base structure 110 so they can move to align with the pipe-laying path 20, as it moves. This is especially important when the fixed clamp assembly 100 is provided on a curved portion of the pipe-laying path 20 as the exact position of the pipe-laying path 20 may alter according to laying conditions. By allowing the fixed clamp assembly 100 to move and maintain alignment with the pipeline 30, large transverse stresses on the pipeline 30 and the fixed clamp assembly 100 can be avoided.

In the embodiment described above, the load bearing structure 120 of the fixed clamp assembly 100 is attached to the base structure 110 in three ways. These three ways (articulated hinge 150, hydraulic struts 161, 162 and tension bars 163) all allow movement of the load bearing structure 120 (and therefore the friction clamp 130 and collar clamp 140) relative to the base structure 110.

It is also possible for the fixed clamp assembly to be attached to a moveable ramp on the vessel. The ramp may be an internal ramp and may be adjustable. The ramp may be pivotable relative to the vessel. The ramp may be provided with sets of rollers or other guide elements which guide the pipeline being laid from the vessel. The guide elements may be adjustably mounted on the ramp with appropriate hydraulic actuators so as to define the desired curvature to the path of the pipeline as it passes over the rollers. The ramp may have a main frame which is suspended at its downstream end by a pair of robust extensible struts, and at its upstream end by a pair of less robust struts. The less robust struts may comprise screw jacks that are pivotally connected at a lower end to the frame and pivotally connected at the upper end to the vessel hull. The purpose of the struts is to adjust the vertical position of the upstream end of the ramp. They do not resist movement of the ramp along the pipe-laying path. The robust struts on the other hand allow movement of the frame along them but are rigidly (non-pivotally) connected to the frame of the ramp at its downstream end. The position of the frame along these robust struts is adjustable by operation of a pair of hydraulic rams and is lockable in a given selected position. Such jacking systems are known per se. The pair of robust struts not only withstands the vertical load imposed by the weight of the ramp and the transverse load imposed by the tension in the pipeline as it passes over the ramp on a curved path, but is also able if necessary to accommodate the loads imposed by the fixed clamp assembly mounted on the ramp. In normal operation the fixed clamp assembly is not operated and no longitudinal load is transmitted from the fixed clamp assembly to the ramp. However, in some circumstances it will be desirable to hold the tension in the pipeline by the fixed clamp assembly (for example to allow the pipeline upstream of the fixed clamp assembly to be cut, as described above). In this case the fixed clamp assembly is clamped to the pipeline and the longitudinal load then exerted on the fixed clamp assembly (which load is likely to be more than 100 tonnes and may be more than 1,000 tonnes) transmitted to the frame of the ramp via a pair of hydraulic rams. The rams are connected to respective ones of the struts which then transmit the longitudinal load through the struts to the frame.

Hence, although the fixed clamp assembly is used for clamping the pipeline in a fixed position on the pipe-laying path, the fixed clamp assembly itself can move in relation to the vessel and the clamps of the fixed clamp assembly can move in relation to the base structure of the fixed clamp assembly. However, this movement is to allow for the clamps of the fixed clamp assembly to align with the moving pipe-laying path and accommodate pitching or other oscillating movement of the vessel. The fixed clamp assembly is not used for progressing the pipeline along the pipe-laying path (either upstream or downstream). Instead, that task is performed by the track tensioners and/or travelling clamp assembly and/or the winch system.

In the above examples, the fixed clamp is orientated so that the load bearing structure of the fixed clamp is downstream of the friction clamp and the friction clamp is downstream of the collar clamp. However, in some embodiments, the configuration of the fixed clamp may be such that the friction clamp and collar clamp are in alternative positions relative to the load bearing structure. For example, the collar clamp could be nearer the load bearing structure than the friction clamp is.

Figure 7:
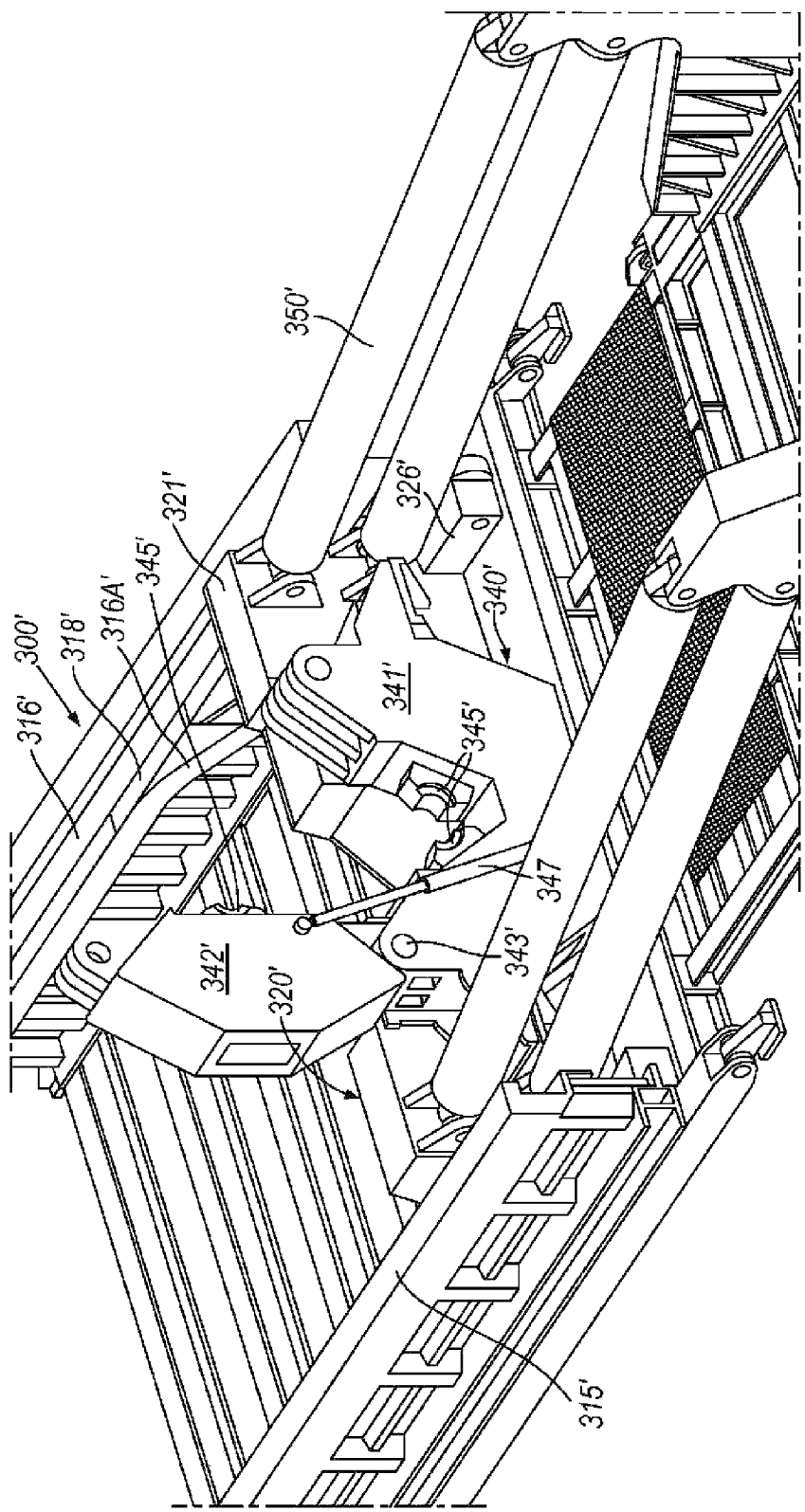
FIG. 7 is an enlarged rear perspective view of part of a travelling clamp assembly.

FIG. 7 shows an alternative arrangement for the travelling clamp assembly 300. In relation to FIG. 7, like elements to those denoted in previous figure will be denoted with a ' suffix.

The travelling clamp assembly 300' of FIG. 7 is very similar to the travelling clamp assembly 300 previously described. Here, only the differences between the two assemblies will be described.

The travelling clamp assembly 300' does not include an upper portion of the load bearing structure 320'. In other words, there is no upper portion 324. Longitudinal loads applied to the upper portion 342' of the collar clamp are transmitted down to the lower portion 341' of the collar clamp and then to the load bearing structure 320'. Also shown in FIG. 7 is a hydraulic actuator 347 for opening and closing the opening of the collar clamp 340'. The hydraulic actuator 347 is mounted on a rear side of the collar clamp 340'. It is mounted at a first end to the lower portion 341' of the collar clamp 340' and mounted at a second end to the upper portion 342' of the collar clamp 340'. Such an actuator is preferably also present in the collar clamp of FIGS. 4 to 6.

The travelling clamp assembly 300' includes inclined rail portions 315A' (not visible) and 316A' of the rails 315, 316. The travelling clamp assembly 300' can be moved to its operative position from the position shown in FIG. 7 by actuating the hydraulic piston and cylinder arrangements 350' to drive the rail portions 326' along inclined portions 315A' and 316A' and lift the load bearing structure 320' and collar clamp 340' onto the pipe-laying path. Once the load bearing structure 320' has been raised onto the upper portions of the rails 315', 316', gusset plates 318' are put in the position shown in FIG. 7 so that the load bearing structure 320' remains at its higher level.

Where in the foregoing description, integers or elements are mentioned which have known, obvious or foreseeable equivalents, then, such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A pipe-laying vessel for S-laying a pipeline, wherein the pipeline moves along a pipe-laying path extending along the vessel, the vessel comprising:
one or more track tensioners disposed along the pipe-laying path, and
a travelling clamp assembly, comprising a clamp mounted for movement along a length of the pipe-laying path,
wherein the track tensioners are positioned downstream of the travelling clamp assembly on the pipe-laying path,
a fixed clamp assembly located on the pipe-laying path for clamping the pipeline in a fixed position on the pipe-laying path,
wherein the track tensioners are positioned upstream of the fixed clamp assembly on the pipe-laying path.

2. A method of S-laying a pipeline from a pipe-laying vessel, the method comprising:
providing the vessel according to claim 1,
the method further comprising the steps of:
laying the pipeline using the track tensioners disposed on the pipe-laying path during a first time interval, and
laying or abandoning the pipeline using the travelling clamp assembly disposed upstream of the track tensioners on the pipe-laying path during a second time interval.

3. A method of S-laying a pipeline from a pipe-laying vessel, the method comprising the step of:
providing the vessel as claimed in claim 1, and
S-laying the pipeline with the vessel.

4. A pipe-laying vessel for S-laying a pipeline, wherein the pipeline moves along a pipe-laying path extending along the vessel, the vessel comprising:
one or more track tensioners disposed along the pipe-laying path, and
a travelling clamp assembly, comprising a clamp mounted for movement along a length of the pipe-laying path,
wherein the track tensioners are positioned downstream of the travelling clamp assembly on the pipe-laying path,
in which one of the travelling clamp assembly and another clamp assembly mounted on the pipe-laying path comprises:
a base structure,
a load bearing structure, and
an abutting clamp,
wherein the abutting clamp is movably mounted on the base structure by a mounting such that the abutting clamp can move with respect to the base structure to align with the pipe-laying path as the pipe laying path moves while the abutting clamp is clamping the pipeline, and
wherein a downstream-facing portion of the abutting clamp is in an abutting relationship with an upstream-facing portion of the load bearing structure such that a downstream force exerted, in use, by the pipeline on the abutting clamp is transmitted to the load bearing structure.

5. The vessel as claimed in claim 4, wherein the another clamp assembly is a fixed clamp assembly located on the pipe-laying path for clamping the pipeline in a fixed position on the pipe-laying path.

6. The vessel as claimed in claim 5, wherein the fixed clamp assembly is a friction clamp.

7. The vessel as claimed in claim 5, wherein the fixed clamp assembly comprises a collar clamp.

8. The vessel as claimed in claim 4, wherein the travelling clamp assembly includes a collar clamp, the collar clamp being moveable between an operative position, in which it is adjustable between a closed and an open condition, and an inoperative position.

9. The vessel as claimed in claim 4, wherein:
the load bearing structure is adjustable between a closed condition in which it surrounds the pipe-laying path and an open condition in which an opening is provided to one side of the pipe-laying path extending from an interior to an exterior of the structure, and
the abutting clamp is adjustable between a closed condition, in which it surrounds the pipe-laying path, and an open condition, in which an opening is provided to one side of the pipe-laying path extending from the interior to the exterior of the structure,
such that when both the load bearing structure and the abutting clamp are in their respective open conditions, they both provide an opening to the same side of the pipeline.

10. A method of S-laying a pipeline from a pipe-laying vessel, the method comprising:
providing the vessel according to claim 4,
the method further comprising the steps of:
laying the pipeline using the track tensioners disposed on the pipe-laying path during a first time interval, and
laying or abandoning the pipeline using the travelling clamp assembly disposed upstream of the track tensioners on the pipe-laying path during a second time interval.

11. A method of S-laying a pipeline from a pipe-laying vessel, the method comprising the step of:
providing the vessel as claimed in claim 4, and
S-laying the pipeline with the vessel.

12. The vessel as claimed in claim 4, wherein the abutting clamp is a collar clamp, and a downstream-facing portion of the collar clamp is in an abutting relationship with an upstream-facing portion of the load bearing structure such that a downstream force exerted, in use, by the pipeline on the abutting clamp is transmitted to the load bearing structure.

13. A pipe-laying vessel for S-laying a pipeline, wherein the pipeline moves along a pipe-laying path extending along the vessel, the vessel comprising:
one or more track tensioners disposed along the pipe-laying path, and
a travelling clamp assembly, comprising a clamp mounted for movement along a length of the pipe-laying path,
wherein the track tensioners are positioned downstream of the travelling clamp assembly on the pipe-laying path,
in which one of the travelling clamp assembly and another clamp assembly mounted on the pipe-laying path comprises:
a load bearing structure, and
an abutting clamp,
wherein a downstream-facing portion of the abutting clamp is in an abutting relationship with an upstream-facing portion of the load bearing structure such that a downstream force exerted, in use, by the pipeline on the abutting clamp is transmitted to the load bearing structure.

14. The vessel as claimed in claim 13, wherein the abutting clamp is movably mounted on the load bearing structure by a mounting such that the abutting clamp moves with respect to the load bearing structure to maintain alignment with the pipe-laying path as the pipe laying path moves while the abutting clamp is clamping the pipeline.

15. The vessel as claimed in claim 13, wherein the another clamp assembly is a fixed clamp assembly located on the pipe-laying path for clamping the pipeline in a fixed position on the pipe-laying path.

16. The vessel as claimed in claim 13, wherein the travelling clamp assembly includes a collar clamp, the collar clamp being moveable between an operative position, in which it is adjustable between a closed and an open condition, and an inoperative position.

17. The vessel as claimed in claim 13, wherein:
the load bearing structure is adjustable between a closed condition in which it surrounds the pipe-laying path and an open condition in which an opening is provided to one side of the pipe-laying path extending from an interior to an exterior of the structure, and
the abutting clamp is adjustable between a closed condition, in which it surrounds the pipe-laying path, and an open condition, in which an opening is provided to one side of the pipe-laying path extending from the interior to the exterior of the structure,
such that when both the load bearing structure and the abutting clamp are in their respective open conditions, they both provide an opening to the same side of the pipeline.

18. A method of S-laying a pipeline from a pipe-laying vessel, the method comprising:
providing the vessel according to claim 13,
the method further comprising the steps of:
laying the pipeline using the track tensioners disposed on the pipe-laying path during a first time interval, and
laying or abandoning the pipeline using the travelling clamp assembly disposed upstream of the track tensioners on the pipe-laying path during a second time interval.

19. A method of S-laying a pipeline from a pipe-laying vessel, the method comprising the step of:
providing the vessel as claimed in claim 13, and
S-laying the pipeline with the vessel.

20. The vessel as claimed in claim 13, wherein the abutting clamp is a collar clamp, and a downstream-facing portion of the collar clamp is in an abutting relationship with an upstream-facing portion of the load bearing structure such that a downstream force exerted, in use, by the pipeline on the abutting clamp is transmitted to the load bearing structure.

21. The vessel as claimed in claim 15, wherein the fixed clamp assembly is a friction clamp.

22. The vessel as claimed in claim 15, wherein the fixed clamp assembly comprises a collar clamp.

* * * * *